United States Patent
Hulten et al.

(10) Patent No.: US 8,739,276 B2
(45) Date of Patent: May 27, 2014

(54) AUTOMATIC CONSTRUCTION OF HUMAN INTERACTION PROOF ENGINES

(75) Inventors: Geoffrey J. Hulten, Lynnwood, WA (US); Patrice Y. Simard, Bellevue, WA (US); Darko Kirovski, Kirkland, WA (US); Jesper B. Lind, Bellevue, WA (US); Christopher A. Meek, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 296 days.

(21) Appl. No.: 12/821,124

(22) Filed: Jun. 22, 2010

(65) Prior Publication Data
US 2011/0314537 A1    Dec. 22, 2011

(51) Int. Cl.
*G06F 21/30*    (2013.01)

(52) U.S. Cl.
CPC ........ *G06F 21/30* (2013.01); *G06F 2221/2133* (2013.01)
USPC .......................................................... 726/17

(58) Field of Classification Search
CPC ........................ G06F 21/30; G06F 2221/2133
USPC .......................................................... 726/17
See application file for complete search history.

(56) References Cited

U.S. PATENT DOCUMENTS

| | | | |
|---|---|---|---|
| 7,505,946 B2 | 3/2009 | Chellapilla et al. | |
| 7,523,499 B2 | 4/2009 | Wilkins et al. | |
| 7,533,411 B2 | 5/2009 | Goodman et al. | |
| 7,533,419 B2 | 5/2009 | Paya et al. | |
| 2005/0065802 A1 | 3/2005 | Rui et al. | |
| 2005/0066201 A1* | 3/2005 | Goodman et al. | 713/202 |
| 2009/0077629 A1 | 3/2009 | Douceur et al. | |
| 2009/0150983 A1* | 6/2009 | Saxena et al. | 726/7 |
| 2009/0259588 A1 | 10/2009 | Lindsay | |
| 2010/0201478 A1* | 8/2010 | Veen et al. | 340/3.1 |
| 2011/0197268 A1* | 8/2011 | Ravikumar et al. | 726/6 |
| 2011/0292031 A1* | 12/2011 | Zhu et al. | 345/419 |

OTHER PUBLICATIONS

Chellapilla, et al., "Using Machine Learning to Break Visual Human Interaction Proofs (HIPs)", retrieved at <<http://research.microsoft.com/en-us/um/people/kumarc/pubs/chellapilla_nips04.pdf >>, in Advances in Neural Information Processing Systems (NIPS2005), dated 2005, pp. 265-272.

(Continued)

*Primary Examiner* — Jacob Lipman
(74) *Attorney, Agent, or Firm* — Bryan Webster; Andrew Sanders; Micky Minhas

(57) ABSTRACT

Human Interaction Proofs ("HIPs", sometimes referred to as "captchas"), may be generated automatically. An captcha specification language may be defined, which allows a captcha scheme to be defined in terms of how symbols are to be chosen and drawn, and how those symbols are obscured. The language may provide mechanisms to specify the various ways in which to obscure symbols. New captcha schemes may be generated from existing specifications, by using genetic algorithms that combine features from existing captcha schemes that have been successful. Moreover, the likelihood that a captcha scheme has been broken by attackers may be estimated by collecting data on the time that it takes existing captcha schemes to be broken, and using regression to estimate the time to breakage as a function of either the captcha's features or its measured quality.

20 Claims, 4 Drawing Sheets

(56) References Cited

OTHER PUBLICATIONS

Misra, et al., "Face Recognition CAPTCHAs", in Proceedings of the Advanced International Conference on Telecommunications and International Conference on Internet and Web Applications and Services (AICT/ICIW 2006), Feb. 19-25, 2006, 6 pages.

Chellapilla, et al., "Designing Human Friendly Human Interaction Proofs (HIPs)", in Proceedings of the SIGCHI Conference on Human Factors in Computing Systems (CHI '05), Apr. 2-7, 2005, pp. 711-720.

"Microsoft Human Interaction Proof (HIP) Technical and Market Overview", retrieved at <<http://download.microsoft.com/download/3/2/0/320e814a-d969-4c6c-a26e-2f3115032d4c/Human_Interaction_Proof_Technical_Overview.doc>>, dated 2006, 9 pages.

Chellapilla, et al., "Computers beat Humans at Single Character Recognition in Reading based Human Interaction Proofs (HIPs)", in proceedings of 2nd Conference on Email and Anti-Spam (CEAS'05), retrieved at <<http://research.microsoft.com/en-us/um/people/kumarc/pubs/chellapilla_ceas05.pdf>>, dated 2005, 8 pages.

Chellapilla et al., "Building Segmentation Based Human-friendly Human Interaction Proofs (HIPs)", in Proceedings of the Second International Workshop on Human Interactive Proofs (HIP'05), retrieved at <<http://research.microsoft.com/en-us/um/people/kumarc/pubs/chellapilla_hip05.pdf>>, dated 2005, 27 pages.

"Microsoft Live Hotmail Under Attack by Streamlined Anti-CAPTCHA and Mass-mailing Operations", Archived Blog, retrieved at <<http://securitylabs.websense.com/content/Blogs/3063.aspx>>, dated Apr. 10, 2008, 9 pages.

International Search Report and Written Opinion Received of the International Searching Authority for PCT Application No. PCT/US2011/041016, mailed on Jan. 2, 2012, 9 pages.

\* cited by examiner

AUTOMATIC CONSTRUCTION OF HUMAN INTERACTION PROOF ENGINES

BACKGROUND

A human interaction proof (HIP), which is sometimes referred to as a "captcha," is a mechanism that is used to distinguish human users from robots. Many services that are available on the web—e.g., e-mail, blogs, social networks, access to patent databases, etc.—are gated by captchas. In a typical captcha scheme, letters and numbers are displayed on a screen as graphics in some way that is designed to obscure the letters and numbers. A user has to type the letters and numbers into a box as a form of proof that the user is human. The theory behind captchas is that recognizing symbols that intentionally have been obscured is a hard problem that demands the flexibility of the human brain. Thus, captchas are something akin to an applied Turing test.

A problem that arises with captchas is that they can be broken in various ways. Once a particular captcha scheme has been in use for some amount of time, the obscured symbols become recognizable in the sense that optical character recognition (OCR) systems can be trained to recognize them. OCR is thus an automated way of breaking captchas, and it can work as long as there is enough data on which to train the OCR. The training data can be generated by human captcha solvers, or can even be generated just by guessing solutions and analyzing which guesses succeed and which ones fail. Since captchas themselves can be used as training data, for as long as a captcha scheme is in use it continues to generate training data that can be used to break the scheme. Thus, captcha schemes generally have a limited shelf life, after which they are likely to have been broken. In addition to OCR, another way to break a captcha scheme is to use inexpensive human labor to solve captchas. Captchas can be transmitted electronically anywhere in the world (including places where labor is inexpensive), and teams of people can be employed to solve captchas. The solved captchas can be used in real-time, or the solutions can be stored and used as training data for OCR systems, thereby allowing human breaking to feed the process of automated breaking.

Since captchas are used to ensure, probabilistically, that services are being used by humans rather than machines, in order for captchas to continue to serve their intended purpose, the captcha schemes often have to be changed. But changing the captcha scheme involves designing and testing a new scheme, which can be labor intensive. Thus, new captcha schemes generally are not designed and deployed as frequently as they could be.

SUMMARY

Captchas may be specified using a system that streamlines the process of describing the elements and parameters of the scheme. Moreover, captchas schemes may be changed and enhanced over time, by using a genetic algorithm to change the elements and parameters of a captcha scheme. Additionally, the effectiveness of captcha schemes may be monitored to determine when an existing scheme has been broken by attackers, or is likely to have been broken.

A captcha specification language may be used to specify a captcha scheme. The language may include features that allow the various elements of a captcha to be specified. For example, a captcha typically includes some sequence of letters and/or numbers that constitute the correct answer to a captcha challenge. In order to create the graphic that is shown to a user as part of a challenge, the symbols (e.g., letters and numbers) may be printed in some font. The symbols may be distorted through warping, skewing, blurring, etc. Distracters that are designed to confuse an OCR system (e.g., lines at various angles, shapes, backgrounds of various levels of contrast, etc.) may be shown with the symbols. The language may allow parameters of the symbols and distracters to be specified—e.g., how much warping, skewing, blurring; the type, size, and shape of the distracters; etc. In one example, parameters may be specified as probability distributions—e.g., a parameter may be specified as a normally distributed random variable, with some mean and variance, so that the actual parameter value used in a specific instance of the captcha will be chosen through a random process with the specified distribution.

One aspect of using a captcha specification language is that it makes it relatively easy for a person to specify new captcha schemes. However, another aspect of using such a language is that it makes it possible to automate the process of generating new schemes. For example, a genetic algorithm may be used to combine elements from captcha schemes that have been discovered to be effective, in order to create new schemes. Moreover, the effectiveness of captcha schemes may be monitored, and statistical techniques may be used to judge the effectiveness of particular features, or combinations of features, of a captcha scheme. In particular, regression analysis may be used to predict how long it will take to break a new captcha scheme as a function of the new scheme's measured level of resistance to existing OCRs, or based on the level of difference between the features of the new scheme and existing schemes.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
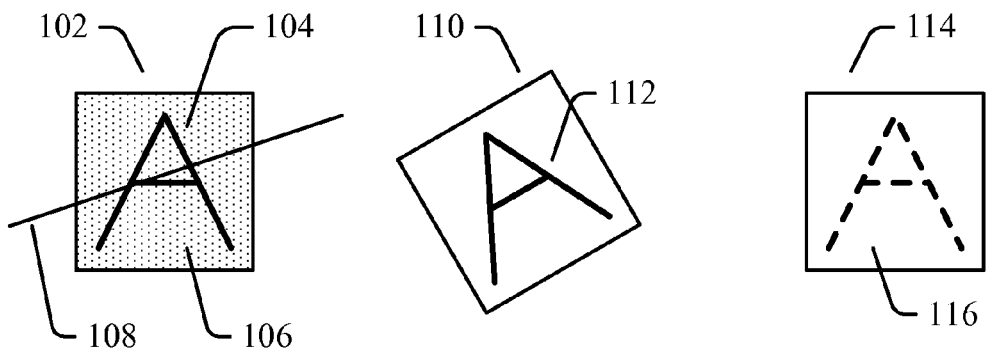
FIG. 1 is a block diagram of some example symbols that may appear in a captcha.

A human interaction proof (HIP) is often used to gate access to services. HIPs are used to distinguish, probabilistically, human users from robots. For example, some web services such as e-mail, blogs, social networking, etc., present a HIP challenge when a user attempts to register for the service. If the user does not pass the HIP challenge, then the user is not allowed to register for the account. As another example, certain actions that people perform on the web, such as posting to a blog, downloading a public record, etc., are gated by HIP challenges, such that service is either allowed or disallowed based on whether a user correctly answers the HIP. An HIP is sometimes referred to as a captcha.

A problem that arises with captchas is that they can be broken. An effective captcha generally depends on being able to show some set of symbols that a human would find relatively easy to recognize, but that a machine would find difficult to recognize. Ordinary, unadorned letters make poor captchas, since optical character recognition (OCR) technology can recognize ordinary letters with relative ease. Thus, captcha schemes generally focus on obscuring letters and numbers in some way-enough that an OCR algorithm would be confused, but not so much as to make the symbols unreadable to a human.

There are various ways of obscuring symbols. For example, the symbols can be warped, skewed, blurred, or transformed in some other manner. Or, distracters can be added to the symbols. Examples of distracters include: lines or curves at various angles that are designed to confuse the segmentation of the captcha into its discrete symbols; backgrounds in various colors or patterns that are designed to confuse the contrast-detection techniques that distinguish a symbol from its background; or other types of distracters. In another example, a captcha scheme may involve having distinct symbols intersect with each other to some degree, which—like the line or curve distracters mentioned above, is also designed to confuse the segmentation of the captcha image into its constituent symbols.

However, no matter how elaborate a captcha scheme is, it can eventually be broken. The use of a captcha scheme provides a continual source of training data. Every captcha that is presented provides an example that a human captcha solver could solve in order to generate training data. Moreover, every time a captcha is presented, even if a robot simply takes an educated guess at the answer, the system that presents the captcha challenge responds with either success or failure. Information about which guesses succeed and which ones failed can, itself, be used as a form of training data. In other words, captchas schemes have a shelf life in the sense that, some amount of time after they are first deployed, enough data will be available such that an OCR with a machine-learning algorithm can be trained to solve the captcha with some level of reliability (possibly with some human-made adjustments to the machine-learning algorithm, the training data, and/or the results the algorithm produces). Moreover, even if training an OCR algorithm on a particular captcha scheme were to prove intractable, the world provides sources of inexpensive labor that can be used to solve captchas. Since captchas may be made up of image data (or even audio data), the data can be sent anywhere in the world where the cost of labor is low. There are businesses in some of these low-cost areas of the world that use human labor to solve captchas at the rate of hundreds of captchas for one dollar.

Thus, the effective use of captchas may depend on changing the captcha scheme frequently to confound OCR solvers. The subject matter herein provides techniques for specifying captcha schemes in order to allow the schemes to be changed easily and quickly. Moreover, the subject matter herein provides techniques for automatically creating new captcha schemes by combining effective features from existing captcha schemes. Additionally, techniques described herein may be used to monitor how long the captcha schemes that have been deployed remain effective, in order to predict when new captcha schemes are likely to have been broken.

In order to create captcha schemes efficiently, a captcha specification language may be used. One example of a captcha specification language is a variant of XAML, which may be referred to as HXAML. XAML (the Extensible Application Markup Language) is a language that is used to define elements of a user interface (UI), including graphical elements. HXAML is an extension to XAML, which may be used to specify the HIP elements of a UI. HXAML provides primitives that are relevant to the problem of obscuring symbols (e.g., blurring, skewing, etc.) HXAML is merely one example of a language that may be used to specify captchas; other mechanisms could also be used. Regardless of the particular captcha specification language that is used, the language may provide mechanisms for specifying the answer to the captcha (i.e., the letters, numbers or other symbols that constitute the correct answer to a captcha challenge), as well as the way in which those symbols are to be drawn and distorted. For example, the language may allow users to specify the font of the symbols; the amount of skew, warp, blurring, etc., that is to be applied to the symbols; the existence and nature of distracters to be drawn with the symbols (e.g., extraneous lines or curves); the nature of the background on which the symbols are to be drawn; the way in which the symbols are to be animated; the extent to which symbols are to intersect; or any other features of the appearance of a captcha. The language may allow the scheme to have some built-in variability. Thus, in one example (without variability), a scheme might specify that a letter is to be skewed thirty degrees clockwise. But, in another example, the amount of skew could be specified as a random variable, such as a normal variable with a mean of thirty degrees and a variance of 100 (i.e., a standard deviation of ten degrees).

Since the captcha specification language allows a captcha to be specified as a combination of features, it is possible to modify the captcha scheme automatically using techniques such as genetic algorithms. Genetic algorithms allow features of existing schemes to be combined in new ways to produce new schemes. In one example, the features from particularly effective captcha schemes may be combined, in order to generate a scheme that has a high likelihood of success.

Moreover, when new captcha schemes are deployed, it is possible to monitor these schemes to determine when they have been broken. Moreover, the data from this monitoring can be used with statistical methods to determine the amount of time that it will likely take for a new scheme to be broken. Given some set of captcha schemes with some set of features, the amount of time that it takes until a captcha scheme to be broken can be mapped against the captcha scheme's features. Then, regression can be used to predict how long it would take to break a particular captcha scheme based on the features that it contains.

Turning now to the drawings, FIG. 1 shows some example symbols that may appear in a captcha. These symbols appear with a variety of features. Drawing 102 is a drawing of the letter A. Drawing 102 includes a representation 104 of the letter A itself. Additionally, drawing 102 shows the letter A on a background 106. Background 106 is represented as a dotted stipple pattern in the drawing of FIG. 1, although in a real-life captcha background 106 might have colors and/or more complicated patterns. Background 106 is designed to confuse an OCR algorithm. Since OCR algorithms generally include a process to distinguish a symbol from the background by looking for regions in which a sharp contrast occurs, the use of a complex background is designed to confuse the OCR algorithm's ability to detect the contrast. Additionally, drawing 102 contains a line 108, which cuts across the representation 104 of the letter A. One hard problem in OCR is the segmentation of portions of an image into symbols. By drawing extraneous lines or curves over the symbols, the problem of segmentation is made more complicated for OCR algorithms that might be used to break a captcha scheme.

Drawing 110 contains another representation 112 of the letter A. In drawing 110, the letter A is rotated about forty-five degrees counterclockwise. Rotation of a representation of a symbol is intended to confuse an OCR algorithm by complicating the problem of orienting the symbol to be recognized.

Drawing 114 contains another representation 116 of the letter A. In drawing 114, the letter A is blurred (as represented by the dashed line). Blurring of a symbol is another way that can be used to confuse an OCR algorithm.

Drawings 102, 110, and 114 show various ways to obscure a symbol that is being drawn. (These drawings are simplified representations of obscuring techniques; in a real-world captcha scheme, more complicated techniques would be used.) Each of the obscuring techniques used in these drawings, as well as the degrees to which they are applied, may constitute the features of a captcha scheme. (For the purpose of the discussion herein, features that tend to obscure the solution to a captcha may be referred to as "complications." Distracters, distortions, background, etc., are examples of complications.) Thus, the fact that a symbol is skewed (as in drawing 110) can be a feature of a particular captcha scheme. Additionally, the amount that the symbols is skewed (e.g., 45 degrees), or the particular way in which a random skew is selected (e.g., a normal random variable with a mean of 45 degrees and a standard deviation of 10 degrees), can also be features of the captcha scheme. The background and distracter line shown in drawing 102 and the blurring of drawing 114 can also be features of a captcha scheme, as can the parameters that describe the extent to which these features are applied. A configurable captcha generator may be used to generate captchas with the specified features. The configurable captcha generator may generate captchas based on specifications written in a captcha specification language, such as HXAML.

Figure 2:
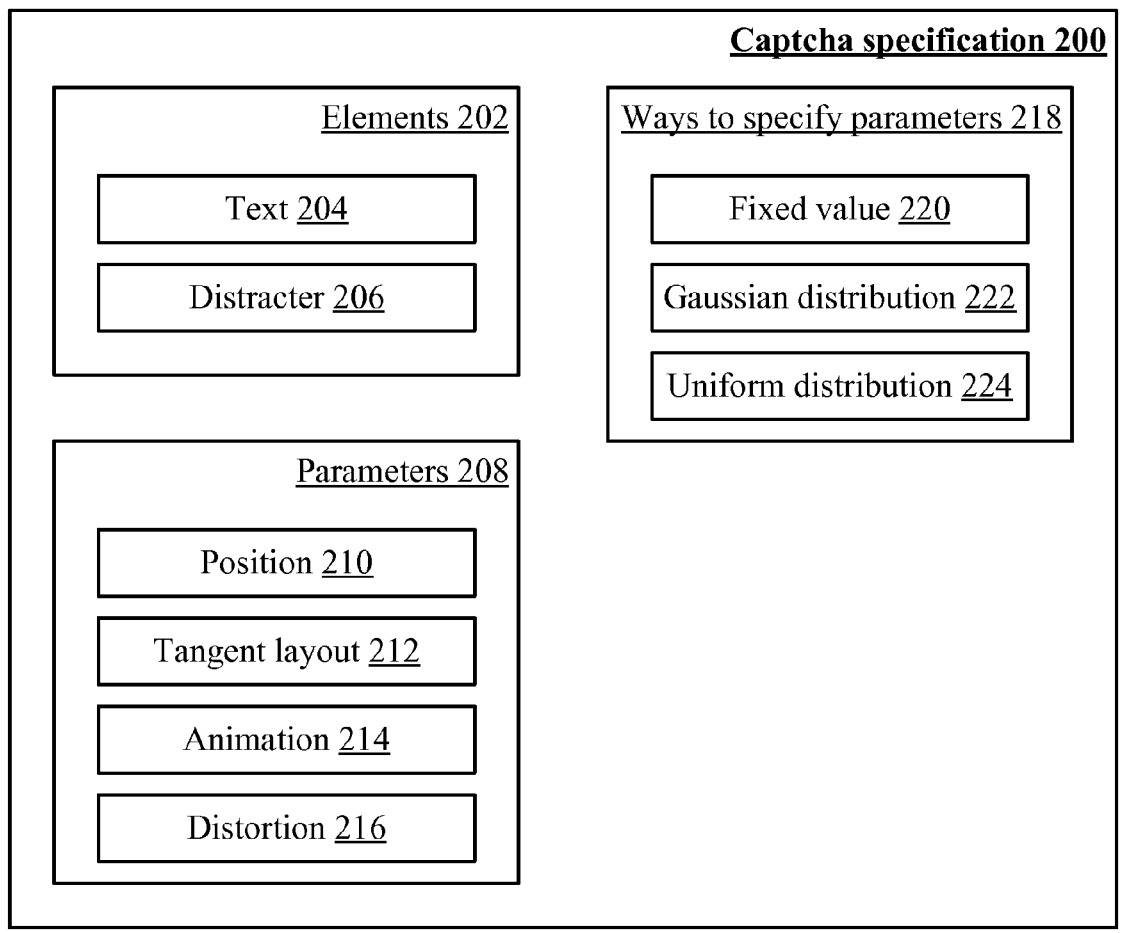
FIG. 2 is a block diagram of various example features that may be specified in a captcha specification.

There are various ways to design a captcha specification language. In one example, the language provides mechanisms to specify the various elements of the captcha, and the parameters that specify how those elements are to be drawn. FIG. 2 shows various example features that may be specified in a captcha specification 200.

A type of feature that may be specified in a captcha specification is the basic visual elements 202. Examples of these elements include the text 204 to be rendered (e.g., a symbol, such as A, B, C, 1, 2, 3, etc.) Another example of a visual element is a distracter 206. To some extent, many features in a captcha (e.g., angle of skew, color or pattern of background, etc.) are designed to be confusing to an OCR algorithm. Distractor 206 is one specific way of creating that confusion, through the drawing of a specific visual elements, such as lines, curves, smudges, etc. Semantically, the distinction between text 204 and distracter 206 is that—while both are objects to be drawn—text 204 is part of the answer to a captcha challenge, while a distracter 206 is not. That is, if text 204 contains the letter A, then the letter A is part of the answer to the challenge. However, if distracter 206 is a line or curve, that line or curve is not part of the answer, but rather a particular way of obscuring the answer.

The various visual elements may be parameterized in some way. Parameters 208 are some example parameters that may be specified in a captcha specification language. One example parameter is the position 210. Symbols in a font generally have a defined quadrilateral boundary with an upper left corner. By default, the upper left corner of a symbol is drawn in the same position as the upper left corner of the area that is designated to draw the symbol. However, the position 210 can be specified as some vertical and/or horizontal offset from that default position.

Another example of a parameter is tangent layout 212, which refers to the extent to which elements intersect with each other. For example, by default symbols are drawn next to each other so as not to intersect. However, intersection among symbols may be a relevant property for captchas, since intersecting symbols tend to confuse visual segmentation algorithms. Thus, given some defined set of objects to be drawn, tangent layout 212 may specify the number of pixels that are to be made to intersect with each other. (One way to define a "set of objects to be drawn" is to put the objects in a container. Thus, the tangent layout parameter might specify the number of intersecting pixels among all objects in the container to which that parameter applies. The use of containers in a captcha specification language is further described below.)

Another example of a parameter is animation 214. Animation refers to the idea that the entire view of the captcha that a user (or OCR engine) would have to see in order to solve the captcha may not be available at a single instant in time. In other words, acquiring the full amount of visual information that it would take to solve the captcha may involve not only space, but also time. In one simple example, animation specifies the rate at which a drawing changes. Many formats for describing visual elements allow some simple form of animation. For example, XAML and the Graphical Interchange Format (GIF) allow objects to be animated by proceeding through, or cycling through, a finite number of drawings. In one example, animation may be specified as follows. Parameters may be specified as random variables that are to be drawn from probability distributions. (The use of probability distributions as parameters is described in greater detail below.) Thus, in this example, the animation parameter might take two arguments, N and x, which specifies that-for each randomized parameter—N values are to be selected according to the random parameter's probability distribution, and these N values are to be cycled on an xsecond timer. Thus, if one parameter is an angle of a line to be drawn, and the parameter is selected from a normal distribution, then animating that line with N=5 and x=2 would select N values from the angle's distribution, and would change the angle of the line every two seconds. The pattern would repeat after five angle changes. However, the foregoing is merely one example of an animation. An animation might take the form of moving "focus" across the letters and numbers in the captcha, so that different parts of the captcha are brought into focus at different times. Or, the animation might involve having pixels of the captcha that are near each other be in their correct relative positions at the same time, but having pixels that are far from each other be in their correct relative positions at different times—thereby complicating the process of performing simple image capture on the captcha, by ensuring that there is not a single point in time at which the entire captcha is shown. One or more parameters could define how this animation is to be performed-i.e., the way in which the captcha is to be shown over a duration of time, rather than all at one time.

Another example of a parameter is distortion 216. Distortion may take various forms. For example, distortion could take the form of blurring, warping, skewing, other types of transformations, or any combination thereof. Each different form of distortion could be specified by a separate parameter, so distortion may actually be specified as a set of parameters. For example, the skew angle could be one parameter, the amount of blurring could be specified as another parameter, and so on.

We now turn to the various different ways 218 to specify parameters. For example, if a particular captcha scheme specifies that an element of the captcha is to be skewed by some angle, there are various way to specify that angle. A parameter could be specified as fixed value 220. However, as noted above, a parameter could be specified as a random variable chosen from some probability distribution. One example of such a probability distribution is a Gaussian (or "normal") distribution 222. Gaussian distributions may be specified by their mean and variance (or standard deviation). Thus, a parameter might be specified as "G10,1", indicating that a number is to be drawn from a normal distribution with a mean of 10, and a variance/standard deviation of 1. Similarly, a parameter could be specified as being drawn from a uniform distribution 224. Thus, a parameter might be specified as "U10,100", indicating that the parameter is to be drawn from a uniform distribution having upper and lower bounds of 10 and 100, respectively. Other distributions (e.g., exponential, binomial, Poisson, chi square, etc.) could be defined. In general, the value specifies the degree to which a particular distortion, or other type of complication, is to be applied to a captcha. E.g., if the value of a blurring parameter is U10,100, then it may be said that blurring is to be applied in a degree that is chosen from a uniform random variable with a range of ten to one hundred.

One way to organize the elements of a captcha, and the parameters that apply to them, is to define containers. For example, a container might contain a letter and its distracters, or a sequence of letters. Parameters could be defined for the container, so that the container's parameters would be applied to any elements in the container. Thus, if a container includes both a symbol and a distracter, and a blur parameter is set on the container, then the blur would be applied both to the symbol and its distracter. Or, if a container contains three letters and a skew parameter, then all letters in the container would be skewed according to the parameter. Or, as another example, if a container contains three letters and a tangent layout parameter is defined for that container, then the three letters would be made to intersect with each other in accordance with the tangent layout parameter.

Captcha-generation programs created using the above-described features may be used by a captcha generation system, which creates captchas in accordance with the specifications that it receives. For example, there may be an HAXML engine that generates captchas based on an HXAML specification.

As mentioned above, there may be reason to change captcha schemes frequently. Since a captcha specification language makes it relatively easy to define a new captcha scheme by changing the features and/or parameters of the scheme, new schemes can be designed relatively quickly. However, some schemes are more effective than others. The following is a description of a process for creating a new captcha scheme. Although captcha schemes can be designed by hand, one aspect of the process described below is that it allows the process of generating captcha schemes to be automated. The process is shown in FIG. 3.

Figure 3:
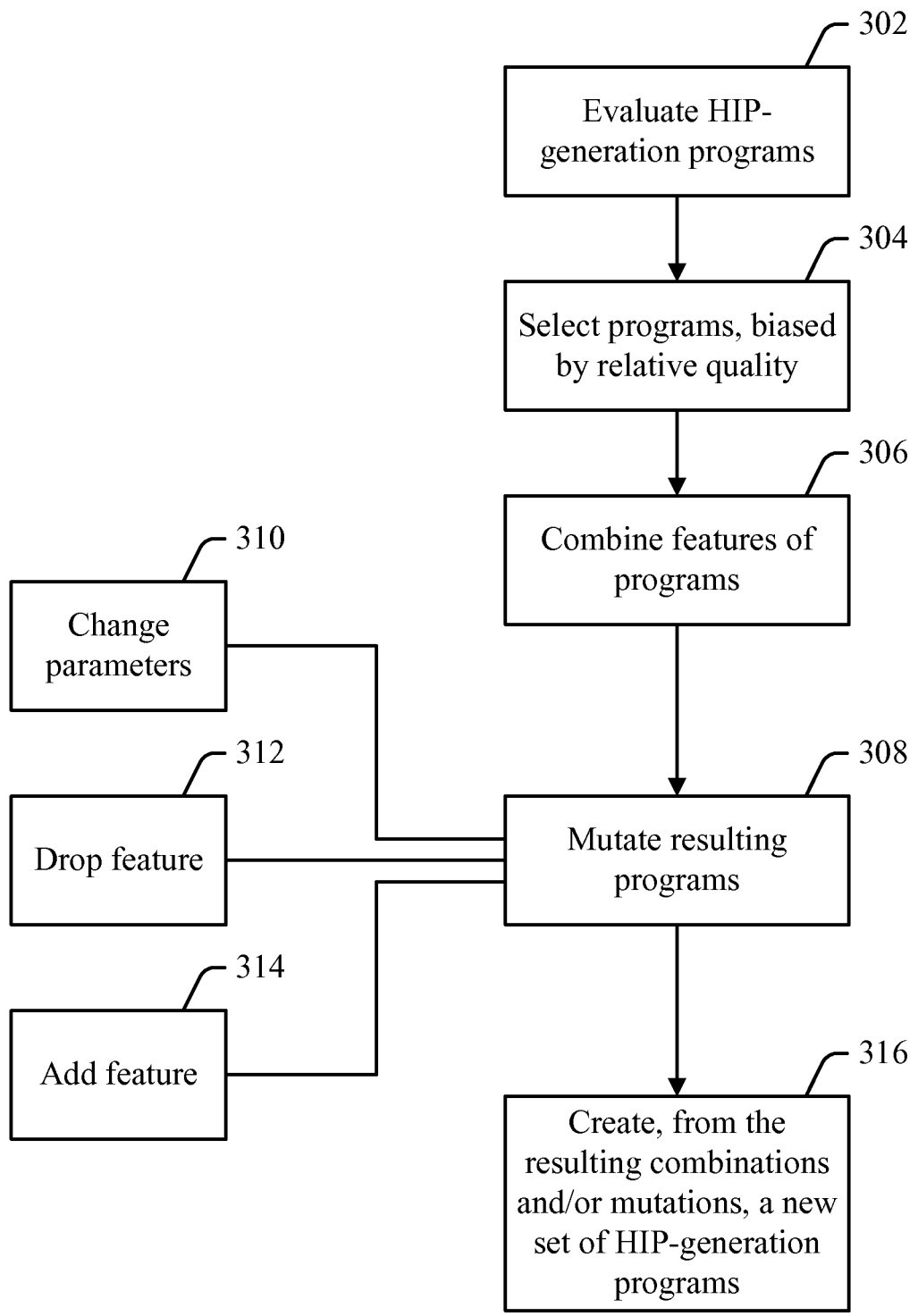
FIG. 3 is a flow diagram of an example process of creating a new captcha scheme.
Figure 4:
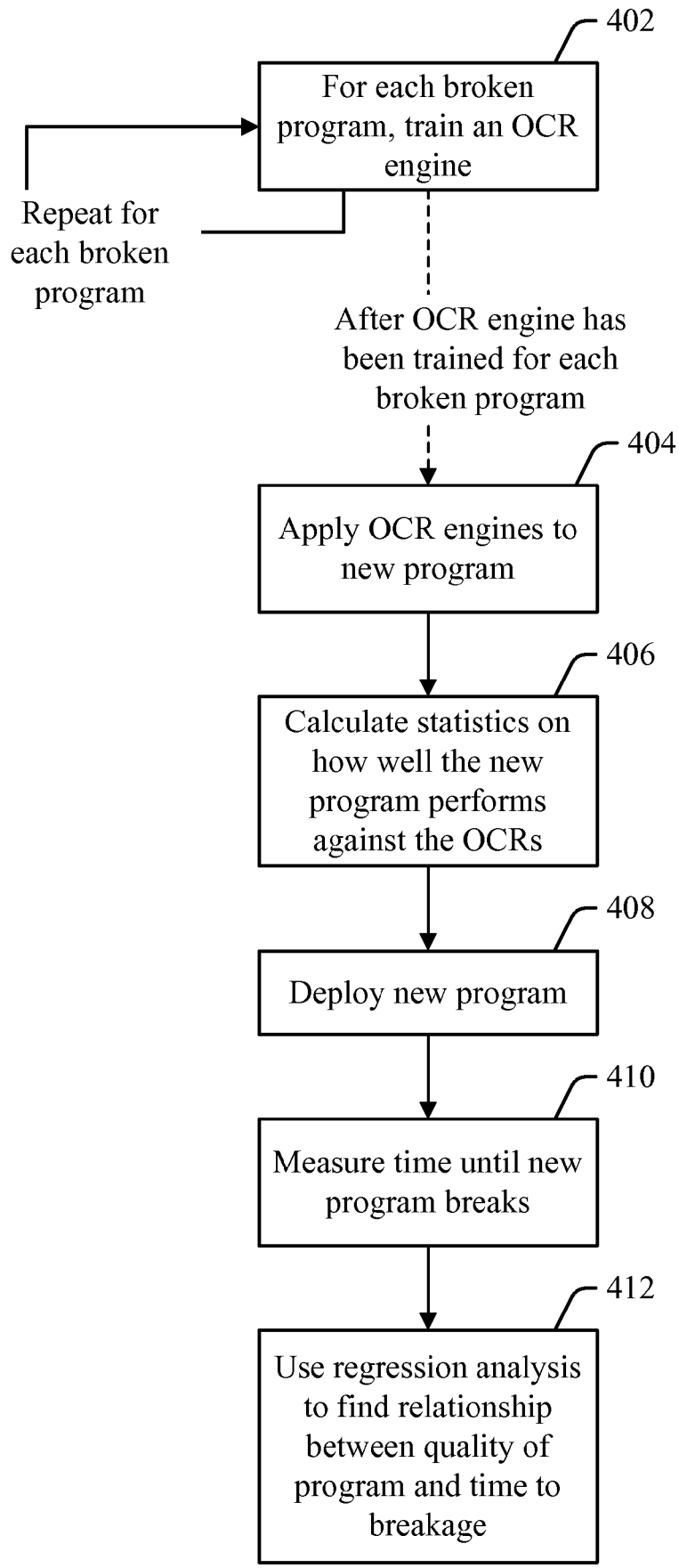
FIG. 4 is a flow diagram of an example process that may be used to assess the quality of a program.

Before turning to a description of FIG. 3, it is noted that the flow diagrams contained herein (both in FIG. 3 and in FIG. 4) are described, by way of example, with reference to components shown in FIGS. 1 and 2, although these processes may be carried out in any system and are not limited to the scenarios shown in FIGS. 1 and 2. Additionally, each of the flow diagrams in FIGS. 3 and 4 shows an example in which stages of a process are carried out in a particular order, as indicated by the lines connecting the blocks, but the various stages shown in these diagrams can be performed in any order, or in any combination or sub-combination.

At 302, a HIP-generation program is evaluated for effectiveness. A HIP generation program is a program that generates captchas in accordance with some captcha scheme. (E.g., "choose five letters of the alphabet, skew the first by an angle chosen from a Gaussian random variable with a mean of 10 and standard deviation of 1, blur the second by an amount chosen from a uniform random variable with bounds 10 and 100, . . . " is an example of a captcha scheme. Such a captcha scheme might be specified in a language such as HXAML.) Judging the effectiveness of a HIP-generation program (or the captcha scheme that the program implements) may involve various considerations. Some example considerations are: how quickly a legitimate user can solve captcha instances generated by the scheme; how difficult it is for an illegitimate user to solve the captchas; or some combination of the scheme being for OCRs, and also difficult (but not prohibitively difficult) for humans. (Difficulty of human solving drives up the cost for people who employ humans to solve captchas, but also discourages legitimate users. Thus, one might like to find a captcha scheme that is very OCR resistant and also takes a human a moderate amount of time (e.g., 15 seconds) to solve.) Since many captcha schemes can eventually be broken, the difficulty for an illegitimate user is generally measured by how long it takes after deployment of the scheme before an OCR algorithm can solve the captchas some percentage of the time. Given that the cost of failure is relatively low (i.e., the system might have to try again, and possibly have an IP address blocked for some period of time), an OCR that can solve the captcha 5% of the time might be considered to have broken the captcha scheme, since the cost of using an OCR-based solver with a 5% success rate is probably not high enough to discourage the use of such a solver. Additionally, if data show that illegitimate users have a success rate in solving captchas that is similar to, or higher than, legitimate users, this fact may indicate that the illegitimate users are solving captchas using human labor (which is generally more accurate than OCR). Even where human labor is inexpensive, it is still generally more expensive than an OCR solution, so any indication that captchas are being solved by human labor tends to indicate failure of attempts to break the scheme with OCR.

Thus, based on the foregoing discussion, the quality of an HIP generation program may be judged by the amount of time that it takes to break it (or by the fact that it has not yet been broken, if that is in fact the case). Regardless of the manner in which the quality of the HIP is judged, some set of programs may be selected in a manner that is biased by quality (at 304). That is, given that the quality of some set of programs, P, has been assessed, a subset of those programs, may be chosen in a way that is random but gives a program a higher probability of being chosen if it has been judged to be of high quality. The subset of programs that are actually chosen by this process may be referred to as P'.

After the programs P' have been chosen, features from pairs of programs may be combined in some manner (at 306). A feature of a program may be a particular way in which symbols are chosen and/or obscured. Thus, a particular alphabet from which to choose symbols is a feature of a program. So is the way in which the symbol is distorted, including any parameters that are used in the distortion. For example, a captcha scheme might define that a letter is to be drawn from in the Arial font, and that a distracter is to be drawn with the letter. In this case, drawing a letter from the Arial font might be one feature, and the use of a line as a distracter (as well as the way in which the length and position of the line are chosen) might be another feature.

At 308, the resulting programs may be mutated in some way. For example, mutation might change a parameter (at 310), drop a feature (at 312), or add a feature (at 314). For example, if a parameter of one of the programs is chosen using a normal random variable with a mean of 10 and a standard deviation of 1, then the program might be mutated by changing the mean to 11 and the standard deviation to 2. Adding and/or dropping features might include adding or removing distracters, adding or removing certain types of distortion, adding or removing symbols from which the text of the captcha is chosen, or any other type of change to an existing HIP-generation program. The various forms of mutation may have probabilities assigned to them, so that a particular mutation has some probably of occurring (or not occurring). For example, the mutation process might be performed so that there is, say, a 25% probability that a parameter will be changed; in other words, the mutation process would actually change only one out of every four parameters. (A probability of zero percent would mean that it is absolutely certain that the change will not occur, and a probability of one hundred percent would mean that it is absolutely certain the change would occur. Thus, to introduce some randomness into the process, the probability of a change occurring may be set somewhere between zero and one hundred percent, exclusive.) Since the selection of programs for P' is biased in favor of high quality programs, there may be reason to avoid changing the features of the programs in P' too much. However, this consideration is balanced against the value of adding features to a captcha scheme that have not yet been seen by OCR engines. Thus, it may be effective to mutate combinations of successful programs to some degree, but not to an excessive degree. These considerations can be balanced by appropriately choosing the probability with which a particular type of mutation will occur.

After the combination of programs and/or mutation of those programs, the result is the creation of a new set of HIP-generation programs (at 316). The resulting programs may combine features of programs that have generally been found to be successful (since the process of selecting the programs is biased in favor of high quality programs), and may also contain some new features (or new versions of old features) through the mutation process. The result is a set of programs that implement new captcha schemes. These captcha schemes may be deployed, and their effectiveness may be judged. As these captchas are deployed (possibly after some amount of testing to ensure the captchas are not too hard and/or too easy to solve), and after their effectiveness is judged, the process may be repeated. That is, the newly-created programs may then be fed into the process shown in FIG. 3, so that the high-quality programs may be combined and/or mutated to create the next generation of captcha schemes.

When a new program is created, there may be reason to try to estimate the shelf life of the program-i.e., how long it will take for the captcha scheme implemented by the program to be broken. FIG. 4 shows an example process that may be used to assess the quality of a new program, based on how long it is estimated that the program can be used before it is broken.

In the process of FIG. 4, it is assumed that there is some set of HIP-generation programs that are known to have been broken in the sense that attackers have successfully trained OCR algorithms on the captcha schemes that the programs implement. For each such broken program, the entity that wants to measure the quality of new programs trains an OCR classifier at 402. (It is assumed that the entity that wants to measure the quality of new programs does not have access to the attackers' trained OCRs, and thus has to start by training its own OCRs on the broken programs). Training the OCR algorithms on the broken captcha schemes is relatively easy. Each program is used to generate a set of captchas and their answers. The captchas and their answers are then used as training data to a machine learning algorithm.

The process of training an OCR at 402 is repeated for each broken program. Thus, if the number of known broken programs is B, then the repetition of 402 will result in B trained OCRs.

After OCRs have been trained for each of the broken programs, the OCRs are applied to captchas generated by the new program (at 404). The new program implements the captcha scheme whose quality we want to assess. The idea behind applying the OCRs to captchas generated by the new program is that the OCRs that have been trained on broken programs is a reasonable estimate of what tools attackers currently have at their disposal to break the new program.

When the OCRs have been applied to captchas generated by the new program, statistics may be calculated on how well the new program performed against the OCRs (at 406). For example, the percentage of captchas that each OCR successfully breaks could be calculated. Using these averages, a statistic could be calculated based on the average percentage over all the OCRs, the maximum percentage among the OCRs, etc. In general, the statistic measures the new program's success at generating captchas that resist recognition by the various trained OCR engines. The program may then be assigned a quality, Q, using whatever statistic is chosen to represent quality.

The program may then be deployed (at 408). I.e., the program may be used to generate actual captchas. Services whose use is gated by the captchas that the new program generates are then monitored to determine when the new program is broken. A measurement is then made of how long it takes between when the program is deployed and when the program is declared to be broken (at 410). This measurement is an amount of time, T. Thus, for each new program, it is possible to calculate two values, Q and T, representing the quality and time-to-breakage of the program, respectively. Regression analysis thus may be used to determine the relationship between quality and time-to-breakage (at 412). That is, the regression of T on Q may be calculated, thereby giving an average time-to-breakage for any given level of quality. Therefore, when a new program is created, its quality can be measured in the way described above (e.g., by training OCRs on known broken captcha schemes, applying those OCRs to a new program, and measuring the new program's resistance to the OCRs). Once the quality has been measured, the time-to-breakage (i.e., the shelf-life of the program) can be estimated using the function that results from the regression analysis.

An alternative way of assessing a new program is to measure its distance from existing programs. Based on the idea that attackers' tools have been trained on existing captcha schemes, it is reasonable to assume that these tools will be more effective on new captcha schemes that are similar to existing ones, and less effective on captcha schemes that are very different from existing once. Thus, a distance metric between two captcha schemes may be defined. For example, if two HIP-generating programs differ in the value of a particular parameter, then the distance between these two parameters could be defined as the numerical difference in their values. Or, when entire elements are present in one program and absent in another program (e.g., where one program contains a particular distracter and another one does not), then the distance could be defined by analogy to the Levenshtein distance (i.e., the number of insertion, deletion, and substitution operations that it takes to transform captcha scheme A so that it has the same features as captcha scheme B). The foregoing are some examples, although any appropriate distance metric could be defined.

Once a distance metric is defined, it is possible to calculate a statistic based on the distances between a new program and each existing broken program. For example, the statistic might be the average distance to the broken programs, the minimum distance, or any other appropriate statistic. Thus, each program can be assigned a statistic, D, representing its distance to the known broken programs. As described above in connection with FIG. 4, the time, T, that it takes for a new program to become broken may also be measured. Thus, any new program may be associated with two values, D and T. By calculating the regression of T on D, it is possible to identify a function that predicts the times that it takes to break a new program (i.e., its shelf life) in terms of the distance between the new program and existing programs.

Figure 5:
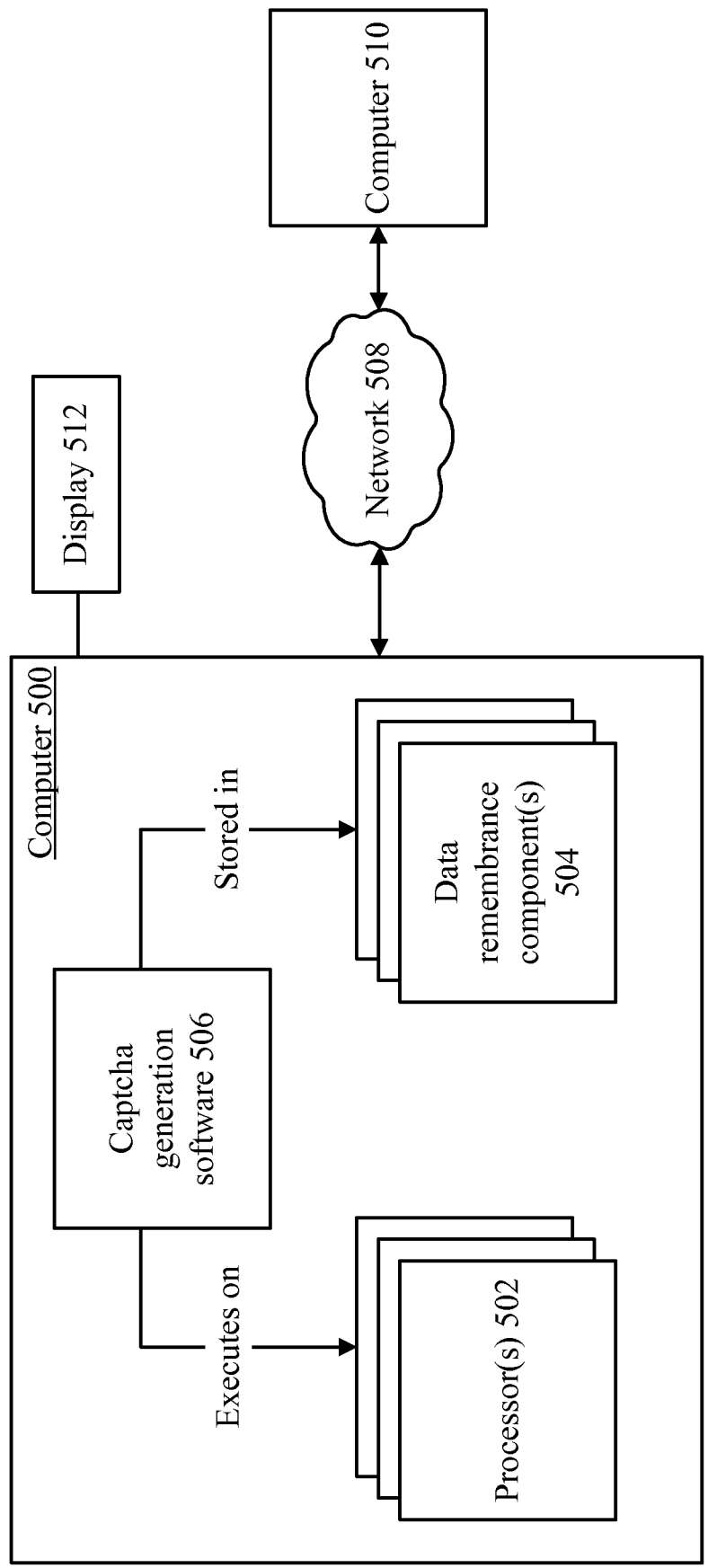
FIG. 5 is a block diagram of example components that may be used in connection with implementations of the subject matter described herein.

FIG. 5 shows an example environment in which aspects of the subject matter described herein may be deployed.

Computer 500 includes one or more processors 502 and one or more data remembrance components 504. Processor (s) 502 are typically microprocessors, such as those found in a personal desktop or laptop computer, a server, a handheld computer, or another kind of computing device. Data remembrance component(s) 504 are components that are capable of storing data for either the short or long term. Examples of data remembrance component(s) 504 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 500 may comprise, or be associated with, display 512, which may be a cathode ray tube (CRT) monitor, a liquid crystal display (LCD) monitor, or any other type of monitor.

Software may be stored in the data remembrance component(s) 504, and may execute on the one or more processor(s) 502. An example of such software is captcha generation software 506, which may implement some or all of the functionality described above in connection with FIGS. 1-4, although any type of software could be used. Software 506 may be implemented, for example, through one or more components, which may be components in a distributed system, separate files, separate functions, separate objects, separate lines of code, etc. A computer (e.g., personal computer, server computer, handheld computer, etc.) in which a program is stored on hard disk, loaded into RAM, and executed on the computer's processor(s) typifies the scenario depicted in FIG. 5, although the subject matter described herein is not limited to this example.

The subject matter described herein can be implemented as software that is stored in one or more of the data remembrance component(s) 504 and that executes on one or more of the processor(s) 502. As another example, the subject matter can be implemented as instructions that are stored on one or more computer-readable storage media. Tangible media, such as an optical disks or magnetic disks, are examples of storage media. The instructions may exist on non-transitory media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium.

Additionally, any acts described herein (whether or not shown in a diagram) may be performed by a processor (e.g., one or more processors 502) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 500 may be communicatively connected to one or more other devices through network 508. Computer 510, which may be similar in structure to computer 500, is an example of a device that can be connected to computer 500, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable storage media that store computer-executable instructions to generate human interaction proofs, wherein the computer-executable instructions, when executed by a computer, cause the computer to perform acts comprising:
   receiving, in a captcha specification language, a definition of a human interaction proof scheme that defines:
      an alphabet from which multiple symbols are to be selected as answers to a human interaction proof,
      multiple complications that are selectable for use in generation of the human interaction proof, and
      multiple values that individually defines extents to which respective complications of the multiple complications are to be applied to the symbols of the alphabet, wherein a first value of the multiple values defines a fixed extent for application of a first complication of the multiple complications, and wherein a second value of the multiple values defines a random extent for application of a second complication of the multiple complications;
   generating a graphical representation of the human interaction proof in accordance with the alphabet and the multiple complications by applying at least the first complication by the fixed extent to a first symbol and applying the second complication by the random extent to a second symbol; and
   employing the graphical representation to selectively control access to a service.

2. The one or more computer-readable storage media of claim 1, wherein the multiple complications comprise a distracter, which constitutes a visual element that is to be drawn with at least one of the multiple symbols.

3. The one or more computer-readable storage media of claim 1, wherein the multiple complications comprise a background against which at least one of the multiple symbols is to be drawn.

4. The one or more computer-readable storage media of claim 1, wherein the multiple complications comprise an amount of skew that is to be applied to at least one of the multiple symbols.

5. The one or more computer-readable storage media of claim 1, wherein the multiple complications comprise an amount of blurring that is to be applied to at least one of the multiple symbols.

6. The one or more computer-readable storage media of claim 1, wherein the multiple complications comprises an amount of warping that is to be applied to at least one of the multiple symbols.

7. The one or more computer-readable storage media of claim 1, wherein a first one of the multiple complications is parameterized by a parameter, wherein said parameter specifies a degree to which the first one of the multiple complications is to be applied, wherein the parameter is specified, in the specification, as a Gaussian random variable, including a mean of the Gaussian random variable and a variance or standard deviation of the Gaussian random variable, and wherein generating the graphical representation comprises:
choosing a value of the parameter from a distribution defined by the Gaussian random variable.

8. The one or more computer-readable storage media of claim 1, wherein a first one of the multiple complications is parameterized by a parameter, wherein the parameter specifies a degree to which said first one of the complications is to be applied, wherein the parameter is specified, in the specification, as a uniform random variable, including upper and lower bounds of the uniform random variable, and wherein generating the graphical representation comprises:
choosing a value of the parameter from a distribution defined by the uniform random variable.

9. The one or more computer-readable storage media of claim 1, wherein the multiple complications comprises an amount of intersection between two or more of the multiple symbols in the human interaction proof, and wherein the amount of intersection is specified by a number of pixels of the two or more of the symbols that are to intersect.

10. The one or more computer-readable storage media of claim 1, wherein the multiple complications comprises an animation of one or more of the multiple symbols in the human interaction proof, and wherein the animation specifies a way in which the human interaction proof is to be shown over a duration of time.

11. The one or more computer-readable storage media of claim 1, wherein the received definition further defines:
a container comprising a first one of the multiple symbols and a first one of the multiple complications, wherein the first one of the multiple complications is applied to each symbol in the container.

12. The one or more computer-readable storage media of claim 11, wherein the container further comprises a second one of the multiple symbols that is distinct from the first one of the multiple symbols.

13. A method of generating human interaction proofs, comprising:
receiving a captcha language specification of a human interaction proof scheme, wherein the captcha language specification defines:
an alphabet of possible answers from which multiple symbols of human interaction proofs may be selected,
a set of complications from which multiple complications for the human interaction proofs may be selected, and
multiple values that individually define extents to which respective complications of the multiple complications are to be applied to the symbols of the alphabet, wherein a first value of the multiple values defines a fixed extent for application of a first complication of the multiple complications; and
generating a graphical representation of a first human interaction proof in accordance with the alphabet and the multiple complications by applying at least the first complication by the fixed extent to a first symbol.

14. The method of claim 13, wherein the set of complications includes at least one of a visual element that is to be drawn with one of more selected symbols, a background against which one of more selected symbols is to be drawn, an amount of skew that is to be applied to one of more selected symbols, an amount of blurring that is to be applied to one of more selected symbols, and an amount of warping that is to be applied to one of more selected symbols.

15. The method of claim 13, wherein the captcha language specification further defines a degree to which at least one of the multiple complications is to be applied for the generation of the graphical representation of the first human interaction proof.

16. The method of claim 13, wherein the captcha language specification further defines a number of pixels by which representations of two or more selected symbols are to overlap in the generated graphical representation.

17. The method of claim 13, wherein the method further comprises:
receiving information regarding effectiveness of the captcha language specification; and
in response to the received information, effectuating a change to the set of complications.

18. A system for generating captchas, comprising:
a memory and a processor that are respectively configured to store and execute instructions for:
receiving a captcha language specification of a human interaction proof scheme, wherein the captcha language specification defines:
an alphabet of possible answers from which multiple symbols of human interaction proofs may be selected,
a set of complications from which multiple complications for the human interaction proofs may be selected, and
multiple values that individually define extents to which respective complications of the multiple complications are to be applied to the symbols of the alphabet, wherein a first value of the multiple values defines a fixed extent for application of a first complication of the multiple complications; and
generating a first human interaction proof in accordance with the alphabet and the multiple complications defined by the received captcha language specification, the human interaction proof used during a determination of whether a human is interacting with a service, and the generation of the first human interaction proof including:
applying at least the first complication by the fixed extent to a first symbol.

19. The system of claim 18, wherein the captcha language specification further defines a degree to which at least one of the multiple complications is to be applied during generation of the human interaction proof.

20. The system of claim 18, wherein the memory and the processor are further configured to store and execute instructions for:
receiving information regarding effectiveness of the captcha language specification; and
in response to the received information, effectuating a change to the set of complications.

* * * * *